United States Patent
Mihajlovski et al.

(10) Patent No.: US 10,970,100 B2
(45) Date of Patent: Apr. 6, 2021

(54) STARTING A SECURE GUEST USING AN INITIAL PROGRAM LOAD MECHANISM

(71) Applicant: International Business Machines Corporation, Armonk, NY (US)

(72) Inventors: Viktor Mihajlovski, Wildberg (DE); Claudio Imbrenda, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 16/296,304

(22) Filed: Mar. 8, 2019

(65) Prior Publication Data

US 2020/0285492 A1    Sep. 10, 2020

(51) Int. Cl.
*G06F 9/455* (2018.01)

(52) U.S. Cl.
CPC ...... *G06F 9/45545* (2013.01); *G06F 9/45558* (2013.01); *G06F 2009/45562* (2013.01); *G06F 2009/45575* (2013.01); *G06F 2009/45587* (2013.01); *G06F 2009/45595* (2013.01)

(58) Field of Classification Search
CPC ............. G06F 9/45545; G06F 9/45558; G06F 2009/45562
USPC .................................................... 718/1–108
See application file for complete search history.

(56) References Cited

U.S. PATENT DOCUMENTS

| | | | |
|---|---|---|---|
| 4,245,302 A | 1/1981 | Amdahl | |
| 5,701,502 A * | 12/1997 | Baker | G06F 13/368 709/201 |
| 6,138,236 A | 10/2000 | Mirov et al. | |
| 6,658,562 B1 * | 12/2003 | Bonomo | G06F 9/44505 713/1 |
| 7,356,677 B1 * | 4/2008 | Rafizadeh | G06F 9/4418 713/1 |
| 7,725,559 B2 * | 5/2010 | Landis | G06F 11/1484 709/215 |
| 7,984,108 B2 | 7/2011 | Landis et al. | |
| 8,387,114 B2 | 2/2013 | Sugarbroad | |
| 8,639,783 B1 | 1/2014 | Bakke et al. | |
| 8,856,504 B2 | 10/2014 | Maino et al. | |
| 9,086,913 B2 | 7/2015 | Shanbhogue et al. | |
| 2008/0177994 A1 * | 7/2008 | Mayer | G06F 9/4418 713/2 |
| 2011/0302400 A1 * | 12/2011 | Maino | G06F 21/72 713/2 |

(Continued)

FOREIGN PATENT DOCUMENTS

JP    2011048661 A    3/2011

OTHER PUBLICATIONS

Howe, Bill. "Virtual appliances, cloud computing, and reproducible research." Computing in Science & Engineering 14.4 (2012): pp. 36-41. (Year: 2012).*

(Continued)

*Primary Examiner* — Satish Rampuria
(74) *Attorney, Agent, or Firm* — Cantor Colburn LLP; Steven Chiu (57) ABSTRACT

A method for starting a secure guest includes receiving, by a hypervisor that is executing on a host server, a request to dispatch a virtual machine (VM) on the host server. The VM is dispatched on the host server by the hypervisor. The VM includes a reboot instruction. The reboot instruction is triggered by the hypervisor to restart the VM in a secure mode.

18 Claims, 9 Drawing Sheets

(56) References Cited

U.S. PATENT DOCUMENTS

| | | | | |
|---|---|---|---|---|
| 2015/0154031 A1* | 6/2015 | Lewis | ............... | G06F 9/4406 713/2 |
| 2016/0216982 A1 | 7/2016 | Variath et al. | | |
| 2019/0095357 A1* | 3/2019 | Ozsoy | ............ | G06F 12/1441 |

OTHER PUBLICATIONS

Wang, Yating, Ray Chen, and Ding-Chau Wang. "A survey of mobile cloud computing applications: Perspectives and challenges." Wireless Personal Communications 80.4 (2015): pp. 1607-1623. (Year: 2015).*

Hatwar, Sarang V., and R. K. Chavan. "Cloud computing security aspects, vulnerabilities and countermeasures." International Journal of Computer Applications 119.17 (2015).pp. 46-53 (Year: 2015).*

Sabahi, Farzad. "Virtualization-level security in cloud computing." 2011 IEEE 3rd International Conference on Communication Software and Networks. IEEE, 2011.pp. 250-254 (Year: 2011).*

Albugmi, Ahmed, et al. "Data security in cloud computing." 2016 Fifth International Conference on Future Generation Communication Technologies (Fgct). IEEE, 2016.pp. 55-59 (Year: 2016).*

Ahmad, Naim. "Cloud computing: Technology, security issues and solutions." 2017 2nd International Conference on Anti-Cyber Crimes (Icacc). IEEE, 2017.pp. 1-6 (Year: 2017).*

Boivie, et al. Hardware Support for Malware Defense and End-to-End Trust. International Business Machines Corporation TJ Watson Research Center Yorktown Heights United States, 2017.

Manjunath, AE. "Design of Software Partitioning for X86 Family Processors: HPPAR." International Journal of Software Engineering and Technology Informatics (2015).

Bolvie et al., "Hardware Support for Malware Defense and End-to-End Trust," International Business Machines Corporation, Final Technical Report, Feb. 2017, 81 pages.

Hunt et al., "Supporting Protected Computing on IBM Power Architecture," International Business Machines Corporation, Mar. 22, 2018, 12 pages.

Hunt, Guerney D. H., "Protected Execution Facility: Secure computing for Linux on OpenPOWER," International Business Machines Corporation, Aug. 28, 2018, 31 pages.

International Search Report; International Application No. PCT/EP2020/055971; International Filing Date: Mar. 6, 2020; dated Jun. 23, 2020; 10 pages.

IBM Publication, "z/Architecture Principles of Operation," IBM® Publication No. SA22-7832-11, 12th Edition, Sep. 2017 (pp. 1-1902).

International Business Machines Corporation (IBM), "Power ISA™ Version 2.07B," Apr. 9, 2015 (pp. 1-1527).

Mel et al., "The NIST Definition of Cloud Computing," National Institute of Standards and Technology, Information Technology Laboratory, Special Publication 800-145, Sep. 2011 (pp. 1-7).

List of IBM Patents or Patent Applictions Treated as Related; (Appendix P), Filed Jun. 7, 2019, 2 pages.

Reinhard T. Buendgen et al., "Incremental Decryption and Integrity Verification of a Secure Operating System Image" U.S. Appl. No. 16/296,334 filed Mar. 8, 2019.

* cited by examiner

STARTING A SECURE GUEST USING AN INITIAL PROGRAM LOAD MECHANISM

BACKGROUND

The present invention relates generally to computer technology, and more specifically, to starting a secure guest using an initial program load (IPL) mechanism.

Cloud computing and storage provides users with capabilities to store and process their data in third-party data centers. Cloud computing facilitates the ability to provision a virtual machine (VM) for a customer quickly and easily, without requiring the customer to purchase hardware or provide floor space for a physical server. The customer may expand or contract the VM according to changing preferences or requirements of the customer. Typically, a cloud computing provider provisions the VM, which is physically resident on a server at the provider's data center. Customers are often concerned about the security of data in the VM, particularly since computing providers often store more than one customer's data on the same server. The customer may desire security between its code/data and the cloud computing provider, as well as between its code/data and that of other VMs running at the provider's site. In addition, the customer may desire security from the provider's administrators, as well as against potential security breaches in other code running on the machine.

To handle such sensitive situations, cloud service providers may implement security controls to ensure proper data isolation and logical storage segregation. The extensive use of virtualization in implementing cloud infrastructure results in unique security concerns for customers of cloud services as virtualization alters the relationship between an operating system (OS) and the underlying hardware, be it computing, storage, or even networking. This introduces virtualization as an additional layer that itself must be properly configured, managed and secured.

SUMMARY

According to one or more embodiments of the present invention, a non-limiting example method includes receiving, by a hypervisor that is executing on a host server, a request to dispatch a virtual machine (VM) on the host server. The VM is dispatched on the host server by the hypervisor. The VM includes a reboot instruction. The reboot instruction is triggered by the hypervisor to restart the VM in a secure mode. Technical effects and benefits of the one or more embodiments can include the ability to start a secure VM using a reboot instruction being executed by a non-secure VM.

In accordance with additional or alternative embodiments of the present invention, the reboot instruction utilizes an initial program load (IPL) mechanism. Technical effects and benefits can include the ability to use a standard IPL mechanism to start a secure VM.

In accordance with additional or alternative embodiments of the present invention, the dispatching includes loading an encrypted image of the VM into a memory of the host server, and loading an unencrypted bootstrap component comprising the reboot instruction into the memory. Technical effects and benefits can include the ability for a hypervisor to start the VM in a non-secure mode without first decrypting an image of the VM.

In accordance with additional or alternative embodiments of the present invention, the dispatching further includes transferring control to the unencrypted bootstrap component. Technical effects and benefits can include the ability for a hypervisor to start the VM in a non-secure mode without first decrypting an image of the VM and then transferring control to a bootstrap component for restarting the VM in a secure mode.

In accordance with additional or alternative embodiments of the present invention, the VM includes encrypted components subsequent to the dispatching. Technical effects and benefits can include the ability for a hypervisor to start the VM in a non-secure mode without first decrypting an image of the VM.

In accordance with additional or alternative embodiments of the present invention, the restart includes decrypting the encrypted components of the VM. Technical effects and benefits can include decrypting an encrypted VM image as part of a restart process.

In accordance with additional or alternative embodiments of the present invention, the VM dispatched by the hypervisor is in a non-secure mode and data of the VM is accessible by the hypervisor. Technical effects and benefits can include the ability for a hypervisor to start the VM in a non-secure mode without first decrypting an image of the VM.

In accordance with additional or alternative embodiments of the present invention, based on a determination that the VM is in the secure mode, preventing the hypervisor from accessing any data of the VM. Technical effects and benefits can include the ability to provide a secure VM environment.

In accordance with additional or alternative embodiments of the present invention, the VM on the host server includes an encrypted image of the VM. In addition, triggering the reboot instruction includes the hypervisor calling a secure interface control to perform the restart in a secure mode, the hypervisor specifying a location of the encrypted image of the VM on the host server and decryption information.

In accordance with additional or alternative embodiments of the present invention, performing the restart includes decrypting, by the secure interface control, the VM based on the decryption information. It also includes restarting the VM based on the decrypted VM, wherein the subsequent to the restarting, the hypervisor is prevented from accessing any data of the VM.

Other embodiments of the present invention implement the features of the above-described methods in computer systems and in computer program products.

Additional features and advantages are realized through the techniques of the present disclosure. Other embodiments and aspects of the invention are described in detail herein and are considered a part of the invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

In accordance with one or more embodiments of the present invention, a new initial program load (IPL) mechanism is provided to allow a guest, or virtual machine (VM), executing on a host server to request a transfer into a secure mode. When in the secure mode, the hypervisor does not have access to the data of the VM. In accordance with one or more embodiments of the present invention, when a VM is executing in a secure mode, a secure interface control implemented in hardware and/or firmware is used to provide isolation between the secure guest and other guests executing on the host server.

In accordance with one or more embodiments of the present invention an encrypted image of a VM is loaded into a VM memory of a host server along with an unencrypted bootstrap component. The bootstrap component has access to information about all memory pages of the encrypted image of the VM as well as a meta-data structure for use in decrypting the image and restarting the VM in a secure mode (i.e., as a secure guest). In accordance with one or more embodiments of the present invention the meta-data structure also includes a list of contiguous regions of the operating system image which can be used. As known in the art, instead of listing all memory pages of an operating system individually, a list of regions that each includes a starting page and number of pages can save space and speed-up processing. For example, if a hypothetical operating system image resides in pages 0, 1, 2, 3, 6 and 7, this could be specified as (0, 4) and (6,2).

In accordance with one or more embodiments of the present invention, the bootstrap component triggers a reboot, or restart, operation by preparing an IPL information block in a new format; setting the IPL information block using, for example a "Diagnose 308 Subcode 5"; and performing the IPL using, for example, a "Diagnose 308 Subcode 3" or a new code. The IPL information block can include: a secure execution (SE) header with an image key and integrity values; a list of memory regions that need to be decrypted; and initialization vectors (IVs), that have been used for the encryption of all pages of the image. In a conventional environment, the IPL information block contains the identification of the boot source, which can be the disk device address, a denomination like CDROM, and so on. For the secure environment implemented by one or more embodiments of the present invention, the boot source identifying information includes encryption keys and memory regions that need to be decrypted. Depending on the encryption method used, one or more embodiments of the present invention implement IVs to add randomness to the encryption. An unique IV can be provided for each of the memory regions. This type of cryptographic method that utilizes IVs can be used to improve the quality of encryption. For example, if two identical memory pages are encrypted with the same secret key but with a different IVs, the encrypted content will be different, which makes it impossible for an adversary to know that content is identical.

"Diagnose" is an example of an instruction that allows a guest operating system to interact with a hypervisor. The Diagnose instruction is used by IBM z Systems®, and Diagnose 308 is specifically used for program-directed IPL (allows the guest to request a reboot) operation. Subcode 5 is used to set the IPL parameters (e.g. boot device to use) and subcode 3 is used to trigger the reboot from the boot device previously specified by subcode 5. The mechanism to request a reboot from within an operating system is architecture dependent. On some x86 machines, it is possible to change the boot device using commercially available software tools.

In accordance with one or more embodiments of the present invention, the hypervisor uses the information from the IPL information block, including the SE header to call the secure interface control (also referred to herein as an "ultravisor") to create a secure guest configuration and perform the unpacking, or decrypting of the encrypted VM image. If the unpacking succeeds, then the unpacked VM gains control, executing in a secure mode. If the unpacking fails, then the VM enters a disabled wait state in non-secure mode.

A VM, running as a guest under the control of a host hypervisor, relies on that hypervisor to transparently provide virtualization services for that guest. These services can apply to any interface between a secure entity and another untrusted entity that traditionally allows access to the secure resources by this other entity. These services can include, but are not limited to memory management, instruction emulation, and interruption processing. For example, for interrupt and exception injection the hypervisor typically reads and/or writes into a prefix area (low core) of the guest. The term "virtual machine" or "VM" as used herein refers to a logical representation of a physical machine (computing device, processor, etc.) and its processing environment (operating system (OS), software resources, etc.) The VM is maintained as software that executes on an underlying host machine (physical processor or set of processors). From the perspective of a user or software resource, the VM appears to be its own independent physical machine. The terms "hypervisor" and "VM Monitor (VMM)" as used herein refer to a processing environment or platform service that manages and permits multiple VM's to execute using multiple (and sometimes different) OS's on a same host machine. It should be appreciated that deploying a VM includes an installation process of the VM and an activation (or starting) process of the VM. In another example, deploying a VM includes an activation (or starting) process of the VM (e.g., in case the VM is previously installed or already exists).

However, for facilitating secure guests, a technical challenge exists where additional security is required between the hypervisor and the secure guests, such that the hypervisor cannot access data from the VM, and hence, cannot provide services such as those described above.

In presently available technical solutions, the hypervisor (e.g., z/VM® by IBM® or open source software Kernel Based Virtual machine (KVM)) starts a new VM on a physical processing unit, or host server, by issuing a Start-Interpretive-Execution (SIE) instruction. Part of a state of the VM and its characteristics are saved in control blocks (as a state description or "SD") pointed to by an operand of the SIE instruction (typically the second operand). The hypervisor, in such cases, has control of the data for the VM, and in some cases such control is required to interpret instructions being executed on the VM. Existing hypervisors rely on using such an interface through the SIE instruction to start VMs.

The secure execution described herein provides a hardware mechanism to guarantee isolation between secure storage and non-secure storage as well as between secure storage belonging to different secure users. For secure guests, additional security is provided between the "untrusted" hypervisor and the secure guests. In order to do this, many of the functions that the hypervisor typically does on behalf of the guests need to be incorporated into the machine. The secure interface control provides a secure interface between the hypervisor and the secure guests. The secure interface control works in collaboration with the hardware to provide this additional security. The term ultravisor (UV) is used herein to refer to one example of a secure interface control that can be implemented by one or more embodiments of the present invention.

The secure interface control, in one example, is implemented in internal, secure, and trusted hardware and/or firmware. For a secure guest or entity, the secure interface control provides the initialization and maintenance of the secure environment as well as the coordination of the dispatch of these secure entities on the hardware. While the secure guest is actively using data and it is resident in host storage, it is kept "in the clear" in secure storage. Secure storage can be accessed by that single secure guest—this being strictly enforced by the hardware. That is, the secure interface control prevents any non-secure entity (including the hypervisor or other non-secure guests) or different secure guest from accessing that data. In this example, the secure interface control runs as a trusted part of the lowest levels of firmware. The lowest level, or millicode, is really an extension of the hardware and is used to implement the complex instructions and functions defined in z/architecture. Millicode has access to all parts of storage, which in the context of secure execution, includes its own secure UV storage, non-secure hypervisor storage, secure guest storage, and shared storage. This allows it to provide any function needed by the secure guest or by the hypervisor in support of that guest. The secure interface control also has direct access to the hardware which allows the hardware to efficiently provide security checks under the control of conditions established by the secure interface control.

One or more embodiments of the present invention provide technological improvements over existing systems that utilize encrypted VM images. Existing systems decrypt the encrypted VM image prior to starting the VM on a host machine. A disadvantage of this approach is that specialized computer instructions are required in the hypervisor to determine whether a VM image is encrypted and to perform the decryption prior to dispatching, or starting, the VM on the host machine. One or more embodiments of the present invention do not require updates to the hypervisor dispatch code or require that the hypervisor be aware that a VM image is encrypted prior to the VM being started on a host machine. In addition, the hypervisor can be utilized to start a secure VM even though once the secure VM is started, the hypervisor does not have access to any data of the secure VM.

One or more embodiments of the present invention provide technological improvements over existing systems by providing a secure environment for executing a VM on a host server that hosts a plurality of VMs. Practical applications of one or more embodiments of the present invention include the ability to prevent unauthorized access (intentional or unintentional) to any data of a secure guest executing on a host machine.

Figure 1:
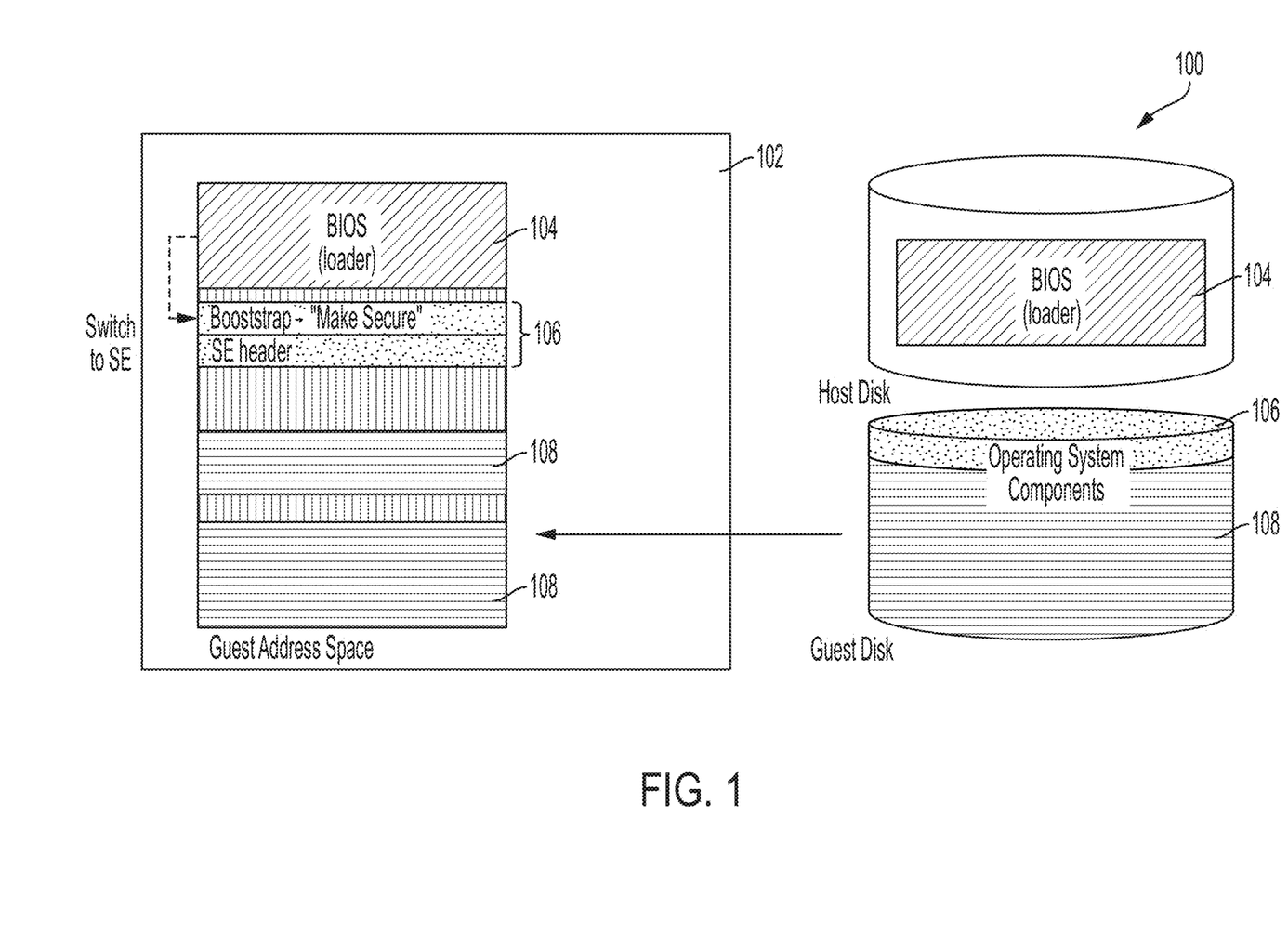
FIG. 1 depicts a schematic diagram of a system for starting a guest using an initial program load (IPL) mechanism according to one or more embodiments of the present invention.

Turning now to FIG. 1, a schematic diagram of a system 100 for starting a secure guest using an IPL mechanism is generally shown in accordance with one or more embodiments of the present invention. The system 100 shown in FIG. 1 includes a guest address space 102 of a host server, a host disk including a basic input/output system (BIOS) 104, or loader, and a guest disk that stores operating system components of the secure guest. The terms "guest" and "virtual machine" or "VM" are used interchangeably herein. The operating system components of the secure guest shown in FIG. 1 include an unencrypted bootstrap component 106 and an encrypted image of the guest 108. In accordance with one or more embodiments of the present invention, a hypervisor that is executing on the host server is instructed to load the guest into the guest address space 102. The hypervisor receives information about where the image of the guest is located, in this case on the guest disk, and initiates the BIOS 104 to load the operating system components into the guest address space 102.

When the BIOS 104 is done loading the operating system components into the guest address space 102, the guest appears to the hypervisor as a non-secure guest. The hypervisor is not aware that the image of the guest is encrypted and not currently operational. The hypervisor transfers control to the bootstrap component 106 whose address is specified, which triggers an initial program load (IPL), or restart, of the guest in a secure mode by the ultravisor. In an IBM Z® implementation, the disk with the operating system components contains a hidden bootmap file which describes where the components reside on disk, to which memory locations they must be loaded, and the address of the first instruction to execute after the initial loading has completed (i.e., the starting address of the bootstrap component). One or more embodiments can be implemented by other architectures which may have a fixed memory address that is used to start execution of the operating system.

As shown in FIG. 1, the bootstrap component 106 includes the bootstrap code executed by the hypervisor to trigger the transition into a secure mode as well as a SE header which includes metadata used by the ultravisor to decrypt the encrypted image of the guest 108.

Figure 2:
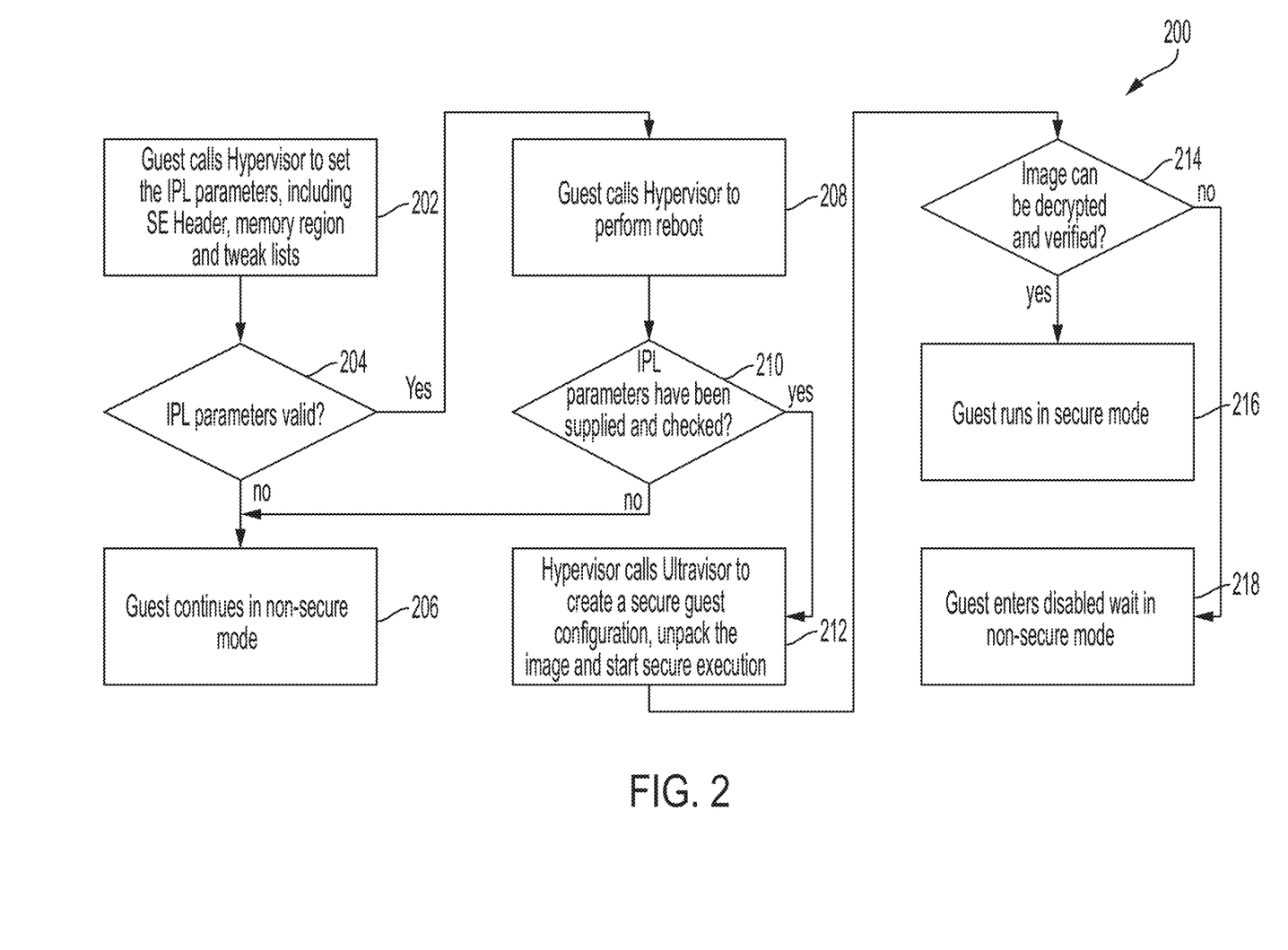
FIG. 2 depicts a flow diagram of a process for starting a secure guest using an initial program load (IPL) mechanism according to one or more embodiments of the present invention.

Turning now to FIG. 2, a flow diagram of a process 200 for starting a secure guest using an initial program load (IPL) mechanism is generally shown in accordance with one or more embodiments of the present invention. The processing shown in FIG. 2 can be performed by a combination of a hypervisor and an ultravisor executing on a host machine. The processing shown in FIG. 2 is performed after operating system components, such the encrypted image of the guest 108 and the bootstrap component 106 of FIG. 1, have been loaded into the memory of a host server, such as guest address space 102 of FIG. 1 and control has been transferred to the bootstrap component.

At block 202, the guest (e.g., the bootstrap code running in the guest) calls the hypervisor to set IPL parameters. The IPL parameters can include, but are not limited to the SE header, a memory region, and initialization vectors (IVs) used for decryption. As used herein, the term "SE header" refers to a data structure containing sensitive information about the operating system, such as the key used to decrypt the operating system image. As this information is sensitive, parts of the SE header must be encrypted, so that only the secure control interface is able to decrypt this data in the SE header. The memory region specifies which memory region (s) in the encrypted image require decryption. In accordance with one or more embodiments of the present invention private/public key pairs are used to perform the encryption and decryption. The VM image can be encrypted using a public key known to the person or entity performing the encryption, and the VM image can be decrypted using a private key known to the ultravisor. One or more embodiments of the present invention may implement any encryption/decryption scheme known in the art, and private/public key pairs are just one example of a scheme that may be implemented. Since the key contained in the SE header is protected, the image encryption key can also be a symmetric key (and used for the decryption as well).

At block 204 of FIG. 2, the hypervisor determines whether the IPL parameters are valid. The validation can include checking the presence of a SE header, the presence of at least one memory region and ensuring that multiple memory regions don't overlap. At block 204, the hypervisor is performing the validity checks and storing the parameters in some memory location owned by the hypervisor and not accessible to the guest. Therefore, the existence of the parameter is a sufficient indication for their validity.

If it is determined, at block 206, that the IPL parameters are not valid, processing continues at block 206 and the guest continues executing in a non-secure mode. If it is determined, at block 206, that the IPL parameters are valid, then processing continues at block 208 with the guest calling the hypervisor to perform a reboot. At block 210, the hypervisor verifies that the IPL parameters have been supplied and checked.

If it is determined, at block 210 of FIG. 2, that the IPL parameters have not been both supplied and checked, then processing continues at block 206 and the guest continues executing in a non-secure mode. If it is determined, at block 210, that the IPL parameters have been supplied and checked, then processing continues at block 212. At block 212, the hypervisor calls the ultravisor to create a secure guest configuration, to unpack (e.g., decrypt) the encrypted image, and to start secure execution of the guest. At block 214 it is determined whether the image was successfully decrypted and optionally verified. In accordance with one or more embodiments of the present invention the decryption is verified by comparing a checksum or hash computed over the image with a checksum stored in the SE header. If the image was decrypted and verified, then processing continues at block 216 with the guest running in a secure mode (i.e., as a secure guest) under control of the ultravisor. If the image was not decrypted and verified, then processing continues at block 218 with the guest entering a disabled wait state in the non-secure mode.

Figure 3:
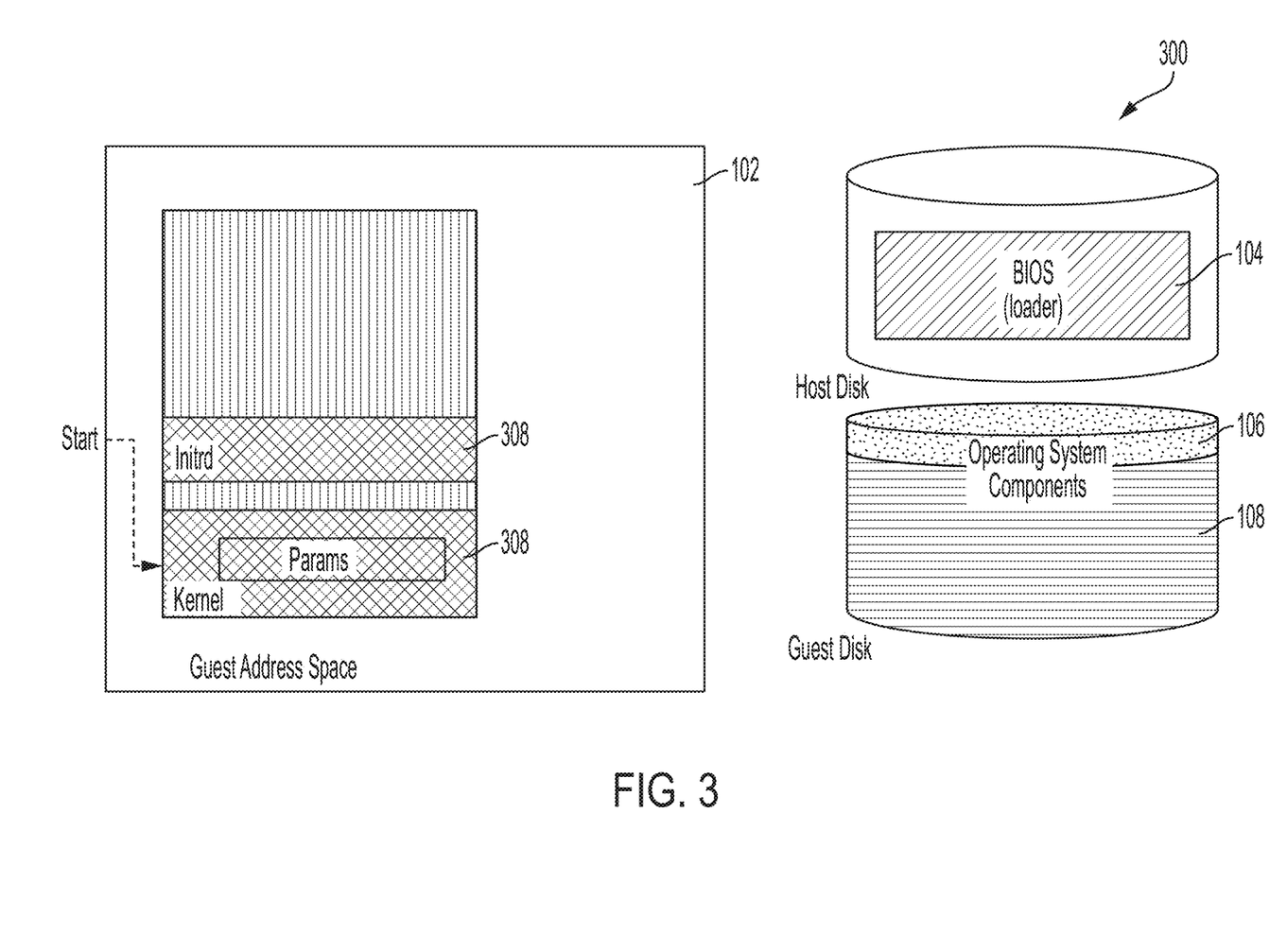
FIG. 3 depicts a schematic diagram of a system that includes a secure guest loaded on a host server according to one or more embodiments of the present invention.

Turning now to FIG. 3, a schematic diagram of a system 300 that includes a secure guest loaded on a host server is generally shown in accordance with one or more embodiments of the present invention. The system 300 shown in FIG. 3 depicts a state of the system 100 of FIG. 1 after the encrypted image is decrypted and the secure system is started on the host machine using a process such as that shown in FIG. 2. As shown in FIG. 3, an unencrypted version of the image 308 is loaded into the guest address space 102 and control has been given to the kernel of the guest to start the secure guest.

Figure 4:
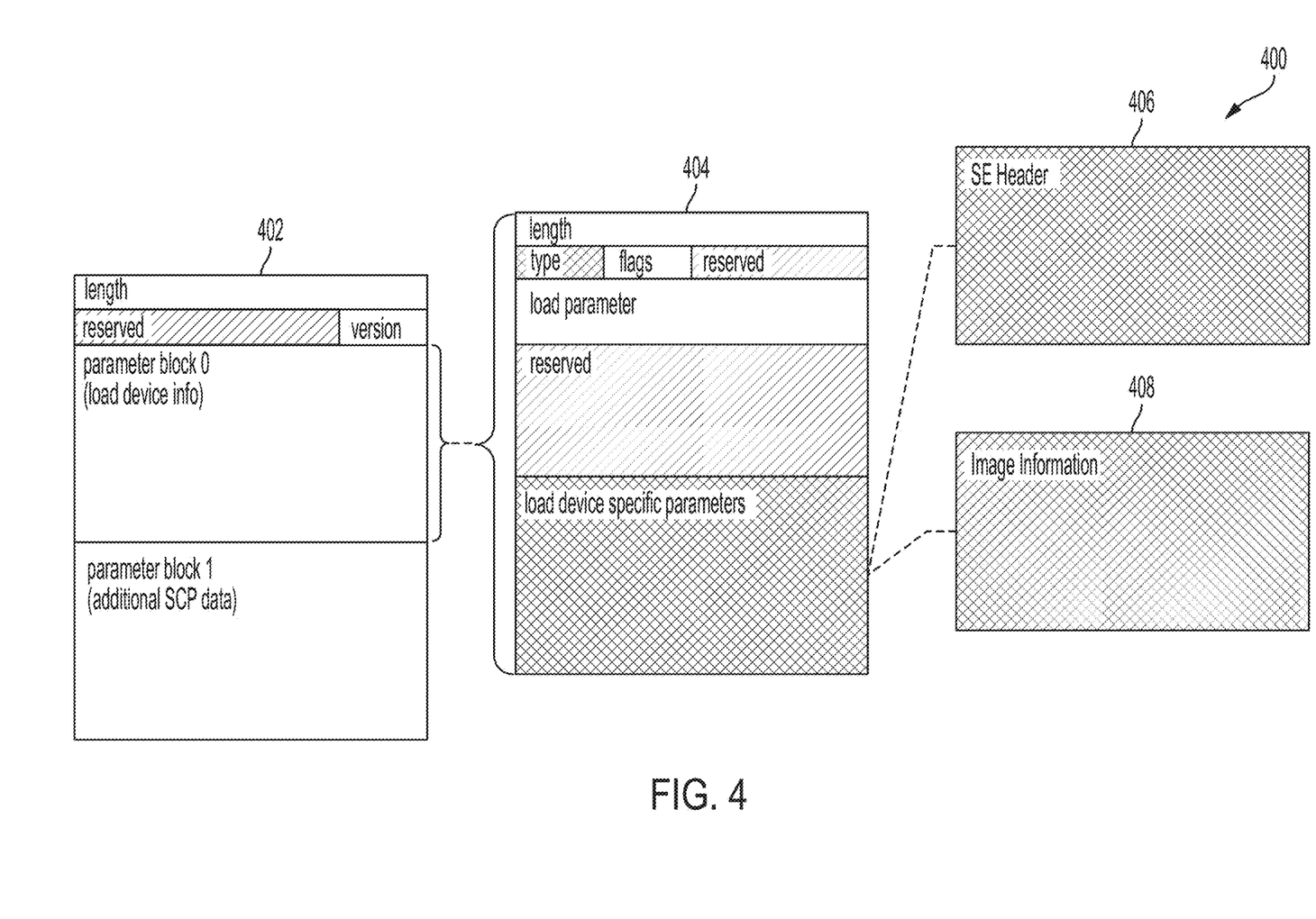
FIG. 4 depicts an IPL information block for starting a secure guest according to one or more embodiments of the present invention.

Turning now to FIG. 4, a schematic diagram of an IPL information block 400 for starting a secure guest is generally shown in accordance with one or more embodiments of the present invention. The overall layout of the IPL information block shown in block 402 is a typical IPL block layout that includes fields for specifying: a length of the block (e.g., in bytes); a version number; a parameter block for load device information such as disk device address, a generic boot device denomination like "CDROM" or a network address; and a parameter block for additional system control parameter (SCP) data that may be used, if the boot method requires parameters not fitting into the first part of the information block. The parameter block for load device information 404 is also a typical IPL block layout with the exception of the type field which in accordance with one or more embodiments of the present invention also includes memory (along with disk, network, etc.) as a new type of IPL being performed. This allows the IPL to load data from the memory of the host server which is where the encrypted VM image is located. In addition, the load device specific parameters block includes new types of information used by the hypervisor to perform the decryption: a SE header 406 with information used to perform the decryption; and image information 408 which can include information that describes the structure of the image in memory.

Figure 5:
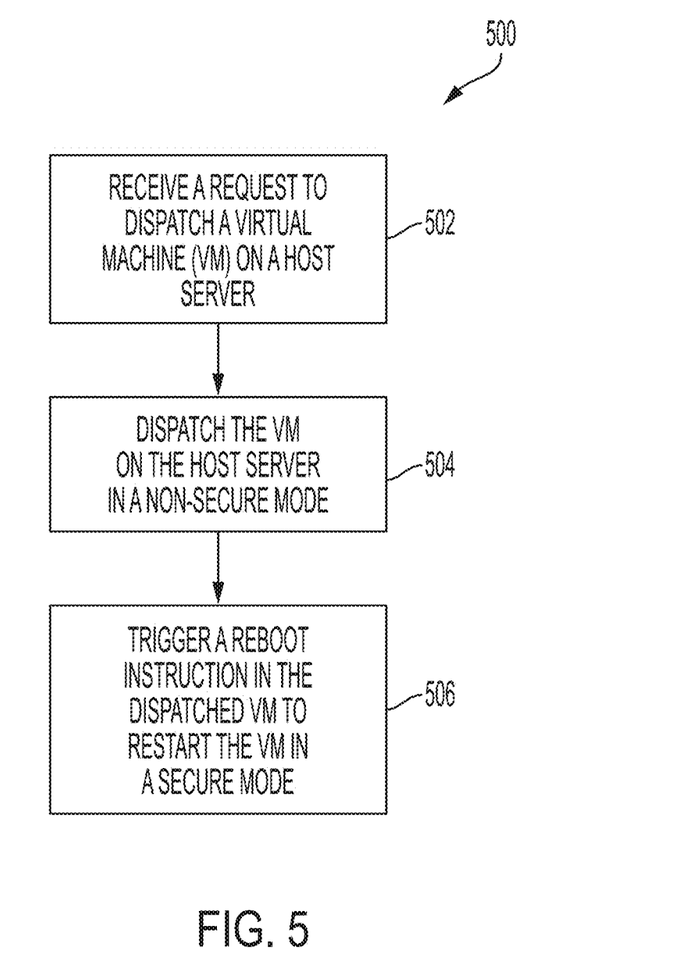
FIG. 5 depicts a process flow for starting a secure guest according to one or more embodiments of the present invention.

Turning now to FIG. 5, a process flow 500 for starting a secure guest is generally shown in accordance with one or more embodiments of the present invention. The processing shown in FIG. 5 can be performed by a hypervisor executing on a host server. At block 502, a request to dispatch a VM on a host server is received by a hypervisor that is executing on the host server. At block 504, the VM is dispatched on the host server in non-secure mode. When the VM is in non-secure mode, the data of the VM is accessible by the hypervisor. The VM includes a bootstrap component containing a reboot instruction used to restart the VM. In accordance with one or more embodiments of the present invention, the dispatching includes loading an encrypted image of the VM into a memory of the host server and loading an unencrypted bootstrap component that includes the reboot instruction into the memory. The dispatching also includes transferring control to the bootstrap component.

At block 506, in accordance with one or more embodiments of the present invention, a secure reboot is initiated by the bootstrap component. The bootstrap component (1) sets the IPL information and (2) requests the reboot. Both (1) and (2) are intercepted by the hypervisor which in response to (2) hands over control to the ultravisor to do the decryption. When the decryption is complete, the ultravisor transfers control to the now secure guest, bypassing the hypervisor. In accordance with one or more embodiments of the present invention, the restarting includes decrypting the encrypted components of the VM. When the VM is in a secure mode the hypervisor is prevented from accessing any data of the VM.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
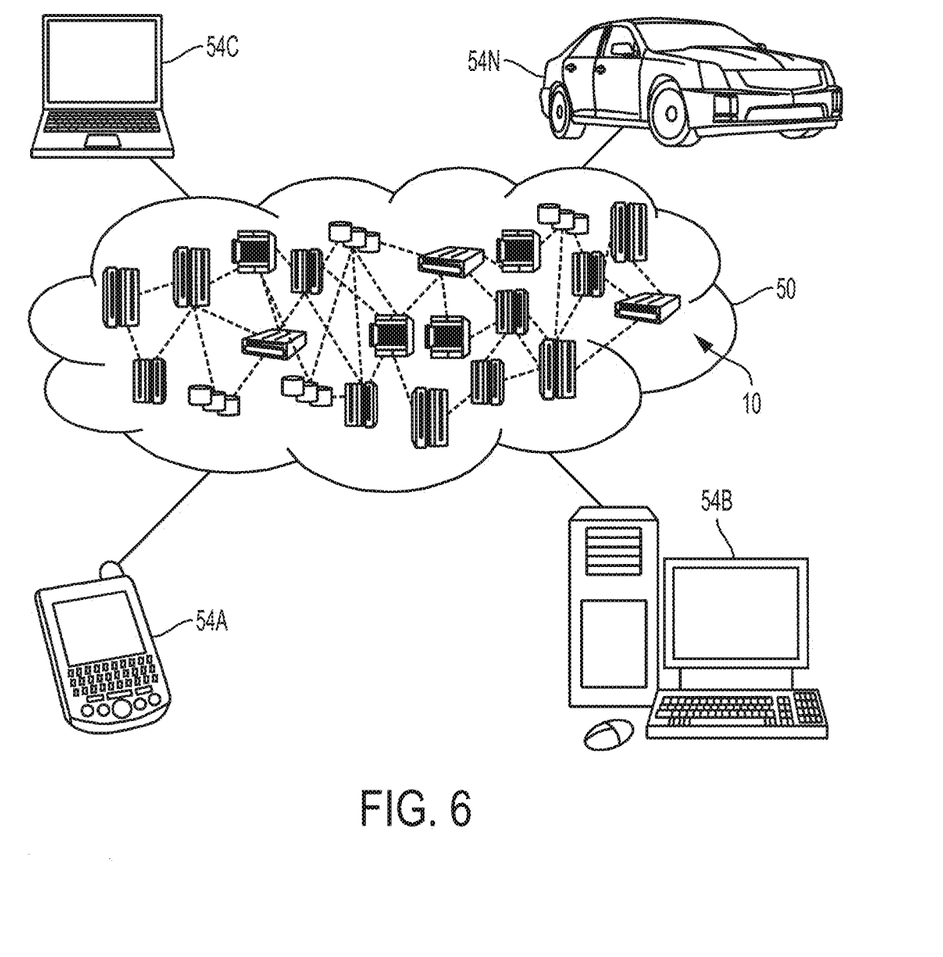
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. are intended to be illustrative only and that computing nodes 10 and cloud computing environment 50 can communicate with any type of computerized device over any type of network and/or network addressable connection (e.g., using a web browser).

Figure 7:
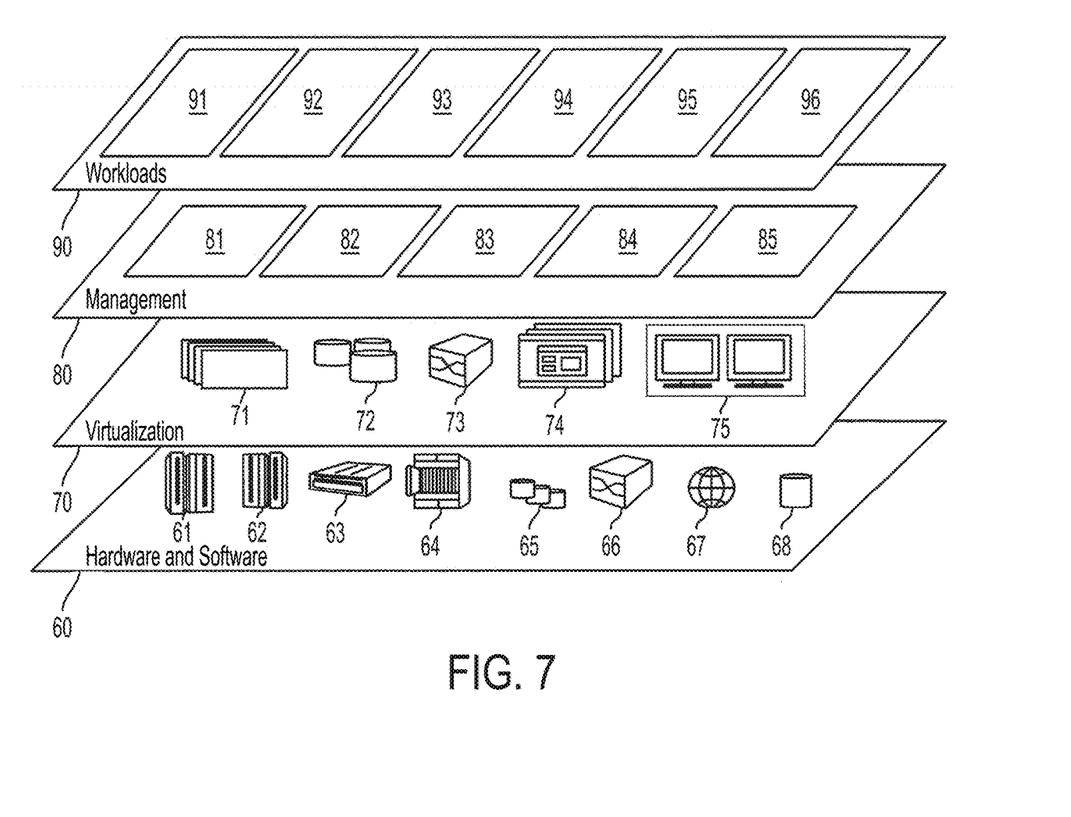
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dispatching secure guests 96. It is understood that these are just some examples and that in other embodiments, the layers can include different services.

Figure 8:
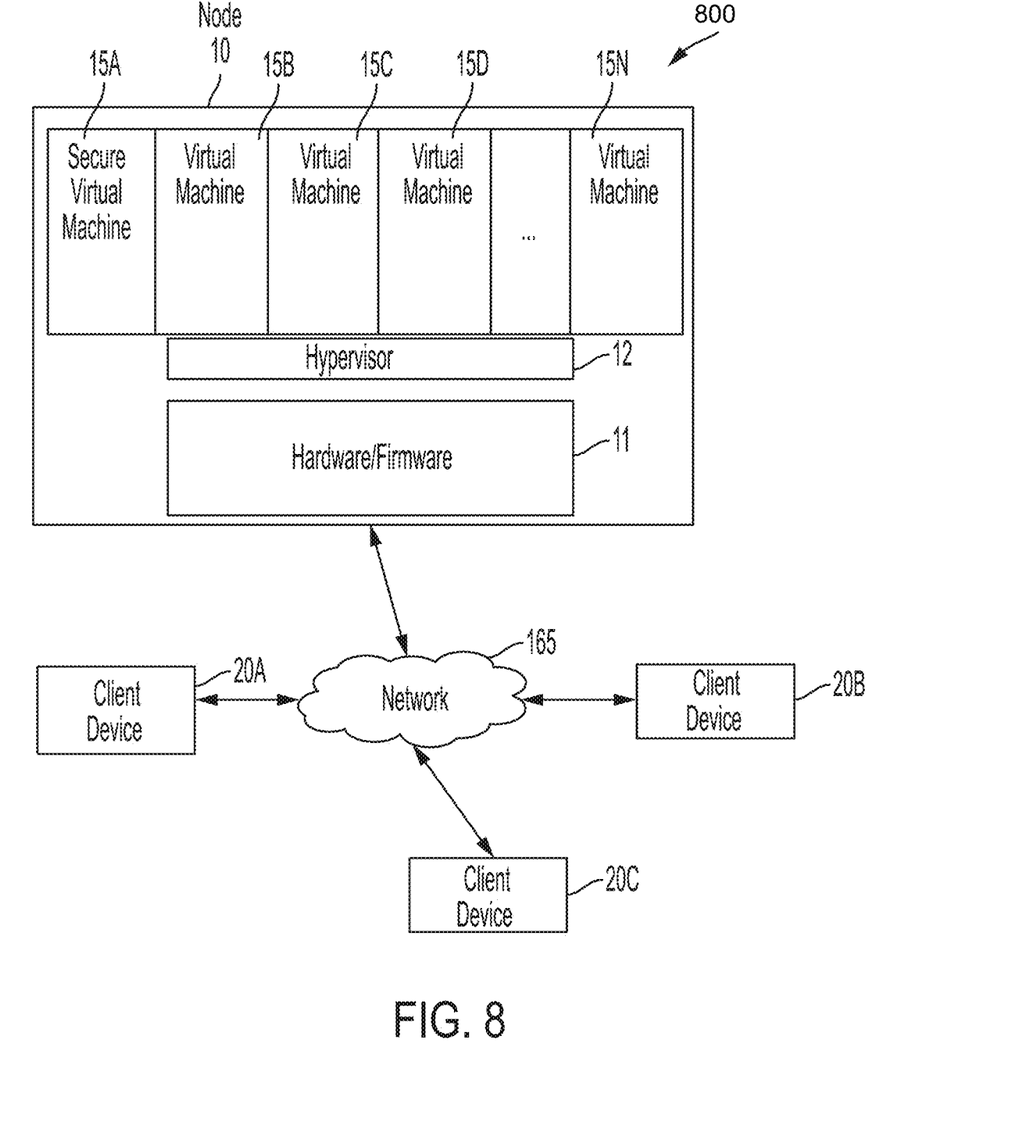
FIG. 8 depicts a system according to one or more embodiments of the present invention.

Turning now to FIG. 8, a system 800 is depicted in accordance with one or more embodiments of the present invention. The system 800 includes an example node 10 (e.g., a hosting node) that is in communication with one or more client devices 20A-20C via a network 165. The node 10 can be a datacenter or host server, of a cloud-computing provider. The node 10 executes a hypervisor 12, which facilitates deploying one or more VMs 15 (15A-15N). The node 10 further includes a hardware/firmware layer 11 that facilitates the hypervisor 12 in providing one or more services to the VMs 15. In existing technical solutions, there are communications between hypervisor 12 and the hardware/firmware layer 11; the hardware/firmware layer 11 and one or more VMs 15; the hypervisor 12 and the one or more VMs 15; and the hypervisor 12 to VMs 15 through the hardware/firmware layer 11. To facilitate a secure VM environment, the hosting node 10 according to one or more embodiments of the present invention, does not include any direct communications between the hypervisor 12 and the one or more VMs 15.

For example, the node 10 can facilitate a client device 20A to deploy one or more of the VMs 15A-15N. The VMs 15A-15N may be deployed in response to respective requests from distinct client devices 20A-20C. For example, the VM 15A may be deployed by the client device 20A, the VM 15B may be deployed by the client device 20B, and the VM 15C may be deployed by the client device 20C. The node 10 may also facilitate a client to provision a physical server (without running as a VM). The examples described herein embody the provisioning of resources in the node 10 as part of a VM, however the technical solutions described can also be applied to provision the resources as part of a physical server.

In an example, the client devices 20A-20C may belong to the same entity, such as a person, a business, a government agency, a department within a company, or any other entity, and the node 10 may be operated as a private cloud of the entity. In this case, the node 10 solely hosts VMs 15A-15N that are deployed by the client devices 20A-20C that belong to the entity. In another example, the client devices 20A-20C may belong to distinct entities. For example, a first entity may own the client device 20A, while a second entity may own the client device 20B. In this case, the node 10 may be operated as a public cloud that hosts VMs from different entities. For example, the VMs 15A-15N may be deployed in a shrouded manner in which the VM 15A does not facilitate access to the VM 15B. For example, the node 10 may shroud the VMs 15A-15N using an IBM z Systems® Processor Resource/Systems Manager (PR/SM) Logical Partition (LPAR) feature. These features, such as PR/SM LPAR provide isolation between partitions, thus facilitating the node 10 to deploy two or more VMs 15A-15N for different entities on the same physical node 10 in different logical partitions.

Figure 9:
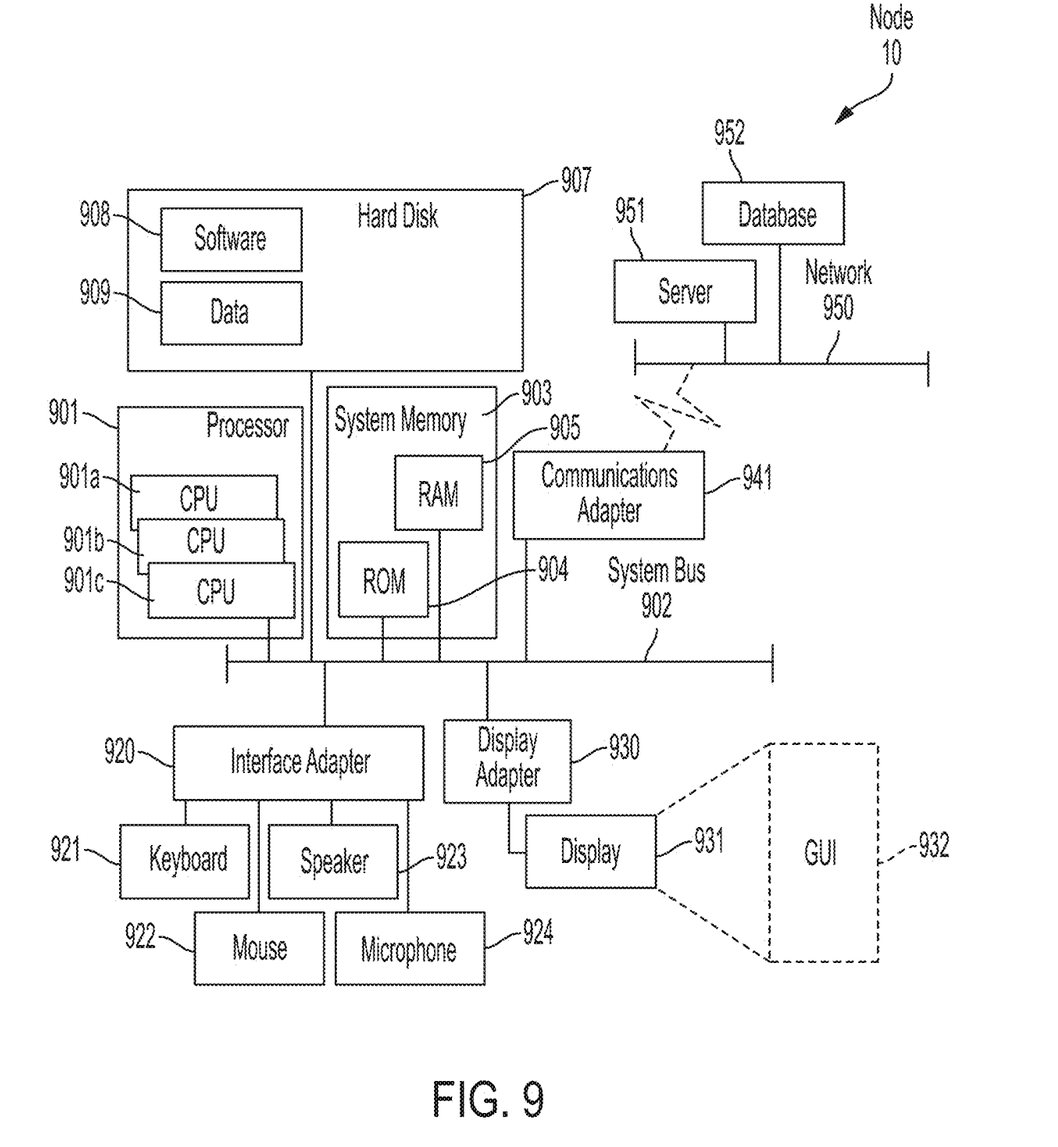
FIG. 9 depicts a processing system according to one or more embodiments of the present invention.

A client device 20A from the client devices 20A-20C is a communication apparatus such as a computer, a smartphone, a tablet computer, a desktop computer, a laptop computer, a server computer, or any other communication apparatus that requests deployment of a VM by the hypervisor 12 of the node 10. The client device 20A may send a request for receipt by the hypervisor via the network 165. A VM 15A, from the VMs 15A-15N is a VM image that the hypervisor 12 deploys in response to a request from the client device 20A from the client devices 20A-20C. The hypervisor 12 is a VM monitor (VMM), which may be software, firmware, or hardware that creates and runs VMs. The hypervisor 12 facilitates the VM 15A to use the hardware components of the node 10 to execute programs and/or store data. With the appropriate features and modifications the hypervisor 12 may be IBM z Systems®, Oracle's VM Server, Citrix's XenServer, Vmware's ESX, Microsoft Hyper-V hypervisor, or any other hypervisor. The hypervisor 12 may be a native hypervisor executing on the node 10 directly, or a hosted hypervisor executing on another hypervisor. Turning now to FIG. 9, a node 10 for implementing the teachings herein is shown in according to one or more embodiments of the invention. The node 10 can be an electronic, computer framework comprising and/or employing any number and combination of computing device and networks utilizing various communication technologies, as described herein. The node 10 can be easily scalable, extensible, and modular, with the ability to change to different services or reconfigure some features independently of others.

In this embodiment, the node 10 has a processor 901, which can include one or more central processing units (CPUs) 901a, 901b, 901c, etc. The processor 901, also referred to as a processing circuit, microprocessor, computing unit, is coupled via a system bus 902 to a system memory 903 and various other components. The system memory 903 includes read only memory (ROM) 904 and random access memory (RAM) 905. The ROM 904 is coupled to the system bus 902 and may include a basic input/output system (BIOS), which controls certain basic functions of the node 10. The RAM is read-write memory coupled to the system bus 902 for use by the processor 901.

The node 10 of FIG. 9 includes a hard disk 907, which is an example of a tangible storage medium readable executable by the processor 901. The hard disk 907 stores software 908 and data 909. The software 908 is stored as instructions for execution on the node 10 by the processor 901 (to perform process, such as the process flows of FIGS. 1-9. The data 909 includes a set of values of qualitative or quantitative variables organized in various data structures to support and be used by operations of the software 908.

The node 10 of FIG. 9 includes one or more adapters (e.g., hard disk controllers, network adapters, graphics adapters, etc.) that interconnect and support communications between the processor 901, the system memory 903, the hard disk 907, and other components of the node 10 (e.g., peripheral and external devices). In one or more embodiments of the present invention, the one or more adapters can be connected to one or more I/O buses that are connected to the system bus 902 via an intermediate bus bridge, and the one or more I/O buses can utilize common protocols, such as the Peripheral Component Interconnect (PCI).

As shown, the node 10 includes an interface adapter 920 interconnecting a keyboard 921, a mouse 922, a speaker 923, and a microphone 924 to the system bus 902. The node 10 includes a display adapter 930 interconnecting the system bus 902 to a display 931. The display adapter 930 (and/or the processor 901) can include a graphics controller to provide graphics performance, such as a display and management of a GUI 932. A communications adapter 941 interconnects the system bus 902 with a network 950 enabling the node 10 to communicate with other systems, devices, data, and software, such as a server 951 and a database 952. In one or more embodiments of the present invention, the operations of the software 908 and the data 909 can be implemented on the network 950 by the server 951 and the database 952. For instance, the network 950, the server 951, and the database 952 can combine to provide internal iterations of the software 908 and the data 909 as a platform as a service, a software as a service, and/or infrastructure as a service (e.g., as a web application in a distributed system).

Thus, as configured in FIG. 10, the operations of the software 908 and the data 909 (e.g., the node 10) are necessarily rooted in the computational ability of the processor 901 and/or the server 951 to overcome and address the herein-described shortcomings of the conventional methods of dispatching VMs from encrypted images of the VMs.

Embodiments described herein are necessarily rooted in computer technology, and particularly computer servers that host VMs. Further, one or more embodiments of the present invention facilitate an improvement to the operation of computing technology itself, in particular computer servers that host VMs, by facilitating the computer servers that host VMs to host secure VMs, in which even the hypervisor is prohibited from accessing memory, registers, and other such data associated with the secure VM. In addition, one or more embodiments of the present invention provide significant steps towards the improvements of the VM hosting computing servers by using a secure interface control that includes hardware, firmware (e.g., millicode), or a combination thereof to facilitate a separation of the secure VM and the hypervisor, and thus maintaining a security of the VMs hosted by the computing server. The secure interface control provides lightweight intermediate operations to facilitate the security, without adding substantial overhead to securing VM state during initialization/exit of VMs as described herein.

Embodiments of the invention disclosed herein may include system, method, and/or computer program product (herein a system) that start a secure guest using an IPL mechanism. Note that, for each of explanation, identifiers for elements are reused for other similar elements of different figures.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
receiving, by a hypervisor that is executing on a host server, a request to dispatch a virtual machine (VM) on the host server;
dispatching, by the hypervisor, the VM on the host server, the VM in a non-secure mode and including an encrypted image of the VM and a reboot instruction that utilizes an initial program load (IPL) mechanism;
triggering, by the hypervisor, the reboot instruction to restart the VM on the host server in a secure mode, the triggering comprising the hypervisor calling a secure interface control to perform the restart of the VM in the secure mode, the hypervisor specifying a location of the encrypted image of the VM on the host server and decryption information; and
performing the restart in response to the triggering, wherein subsequent to performing the restart, the hypervisor is prevented from accessing any data of the VM.

2. The method of claim 1, wherein the dispatching includes:
loading the encrypted image of the VM into a memory of the host server; and
loading an unencrypted bootstrap component comprising the reboot instruction into the memory.

3. The method of claim 2, wherein the dispatching further includes transferring control to the unencrypted bootstrap component.

4. The method of claim 1, wherein the VM includes encrypted components subsequent to the dispatching.

5. The method of claim 4, wherein the restart includes decrypting the encrypted components of the VM.

6. The method of claim 1, wherein when the VM is dispatched by the hypervisor in the non-secure mode the data of the VM is accessible by the hypervisor.

7. The method of claim 1, wherein based on a determination that the VM is in the secure mode, preventing the hypervisor from accessing any data of the VM.

8. The method of claim 1, wherein performing the restart comprises:
decrypting, by the secure interface control, the VM based on the decryption information; and
restarting the VM based on the decrypted VM.

9. A system comprising:
a memory;
a secure interface control; and
a processing unit coupled with the memory and the secure interface control, the processing unit configured to execute a hypervisor that hosts a plurality of virtual machines (VMs), the hypervisor prohibited from directly accessing any data of a VM when the VM is in a secure mode, and wherein the hypervisor is configured to perform:
receiving, by a hypervisor that is executing on a host server, a request to dispatch a VM on the host server;
dispatching, by the hypervisor, the VM on the host server, the VM in a non-secure mode and including an encrypted image of the VM and a reboot instruction that utilizes an initial program load (IPL) mechanism;
triggering, by the hypervisor, the reboot instruction to restart the VM on the host server in a secure mode, the triggering comprising the hypervisor calling a secure interface control to perform the restart of the VM in the secure mode, the hypervisor specifying a location of the encrypted image of the VM on the host server and decryption information; and
performing the restart in response to the triggering, wherein subsequent to performing the restart, the hypervisor is prevented from accessing any data of the VM.

10. The system of claim 9, wherein the dispatching includes:
loading the encrypted image of the VM into a memory of the host server; and
loading an unencrypted bootstrap component comprising the reboot instruction into the memory.

11. The system of claim 10, wherein the dispatching further includes transferring control to the unencrypted bootstrap component.

12. The system of claim 9, wherein the VM includes encrypted components subsequent to the dispatching.

13. The system of claim 12, wherein the restart includes decrypting the encrypted components of the VM.

14. The system of claim 9, wherein when the VM is dispatched by the hypervisor in the non-secure mode the data of the VM is accessible by the hypervisor.

15. A computer program product comprising a computer readable storage medium, the computer readable storage medium comprising computer executable instructions, which when executed by a processing unit causes the processing unit to perform a method comprising:
receiving, by a hypervisor that is executing on a host server, a request to dispatch a virtual machine (VM) on the host server;
dispatching, by the hypervisor, the VM on the host server, the VM in a non-secure mode and including an encrypted image of the VM and a reboot instruction that utilizes an initial program load (IPL) mechanism;
triggering, by the hypervisor, the reboot instruction to restart the VM on the host server in a secure mode, the triggering comprising the hypervisor calling a secure interface control to perform the restart of the VM in the secure mode, the hypervisor specifying a location of the encrypted image of the VM on the host server and decryption information; and
performing the restart in response to the triggering, wherein subsequent to performing the restart, the hypervisor is prevented from accessing any data of the VM.

16. The computer program product of claim 15, wherein the dispatching includes:
loading the encrypted image of the VM into a memory of the host server; and
loading an unencrypted bootstrap component comprising the reboot instruction into the memory.

17. The computer program product of claim 16, wherein the dispatching further includes transferring control to the unencrypted bootstrap component.

18. The computer program product of claim 15, wherein the VM includes encrypted components subsequent to the dispatching and the restart includes decrypting the encrypted components of the VM.

* * * * *